United States Patent [19]
Saunders

[11] 3,977,031
[45] Aug. 31, 1976

[54] INFLATION SYSTEM
[75] Inventor: Roger I. Saunders, Hollis, N.H.
[73] Assignee: Sanders Associates, Inc., Nashua, N.H.
[22] Filed: Feb. 28, 1975
[21] Appl. No.: 554,254

[52] U.S. Cl. .................................. 9/323; 9/8 R; 116/124 B
[51] Int. Cl.² .......................................... B63C 9/18
[58] Field of Search ............... 9/8 R, 321, 323, 325; 116/124 B; 141/114

[56] References Cited
UNITED STATES PATENTS

| 1,014,546 | 1/1912 | Wich | 9/323 |
| 3,355,751 | 12/1967 | McGroarty | 9/323 |
| 3,820,956 | 6/1974 | Titterington | 9/321 X |

Primary Examiner—Richard E. Aegerter
Assistant Examiner—Frederick R. Schmidt
Attorney, Agent, or Firm—Louis Etlinger; Robert K. Tendler

[57] ABSTRACT

An inflation system for sonobuoys and the like is disclosed in which lithium hydride in finely divided form is cast upon the surface of water ingested into a bag carried by the sonobuoy as the sonobuoy descends in the water. A spring loaded pumping system is actuated when the sonobuoy and bag are immersed in the water, with the extension of the spring also causing the ejection of the lithium hydride from a canister within the bag. The casting of the finely divided lithium hydride onto the surface of the water provides for extremely rapid gas generation such that quickly descending sonobuoys may be rapidly returned to the sea surface. Righting of the buoy is accomplished by the suspension of batteries and sonar apparatus beneath the bag through a snorkel so that the snorkel is extended and the bag righted upon immersion. The snorkel tube provides for a predetermined pressure head as well as for sealing of the buoy bag when the buoy is tilted due to wave action. Two different dispenser cap removal systems are described as well as the use of a "c" spring to maintain the generally ellipsoid configuration of the expanded bag.

20 Claims, 17 Drawing Figures

INFLATION SYSTEM

This invention relates to an expandable bag inflation system and more particularly to a system for rapidly generating gas within a bag upon immersion of the bag in an aqueous medium.

In one class of air-dropped sonobuoys it is common to affix the sonobuoy apparatus to a buoy which permits floatation of the transmitter at the sea surface. Rigid floatation apparatus has been utilized in the past but size and weight of this type of floatation precludes use in heavy buoys. With this configuration the rigid float typically occupies ½ to ⅔ of the total package which results in severe space problems in the packaging of the sonar apparatus and its suspension. In an effort to get away from the rigid float configuration expandable gas bags inflated by $CO_2$ cartridges have been utilized. However, apparatus including squibs and extra batteries necessary for the activation of the $CO_2$ cartridges are both expensive and heavy, thereby limiting the use of this type of inflation system.

Inflation systems such as that described in U.S. Pat. No. 3,461,835 issued to M. H. Cockbill et al on Aug. 19, 1969 utilize a lithium hydride inflation system for a balloon in which water is ingested upon release of an activation spring carried within the folded bag structure. The lithium hydride material is carried in ring form at the base of the bag and the ingested water when impinging upon the rings of lithium hydride cause hydrogen to be formed which inflate a balloon. It will be noted that in this patent the spring member is carried, not within the bag to be expanded, but rather in a separate housing. Moreover, the method of generating hydrogen depends on the contact of the water with the rings of lithium hydride material. The process taught by the Cockbill et al patent results in a gas generation which is much too slow for most air-dropped sonobuoy applications, because such sonobuoys typically sink rapidly after water impact. If buoyancy gas is not generated quickly enough, the sonobuoy will sink too deep for the available gas volume to generate sufficient buoyancy to raise the buoy and the buoy will never return to the sea surface. In order to prevent such failures the buoyancy gas must be generated quickly. Thus the provision of tablets however shaped in the chamber into which water is inducted precludes the use of these systems in airdropped sonobuoys as the limited tablet surface area available for immediate reaction with the water is insufficient to provde an adequate rate of reaction.

The subject invention solves the above problem by providing a container of finely divided reaction material which is suspended above the cavity into which water is ingested. Upon release of an activation spring similar to that illustrated in the Cockbill et al patent, finely divided reaction material is cast upon the surface of the ingested water resulting in rapid evolution of gas and rapid bag inflation. Moreover, in accordance with one aspect of the subject invention, the bag which is to be inflated includes the activation spring, with apparatus to be maintained above the sea surface supported by the top portion of the inflated bag. In one embodiment, the bag is maintained in an upright position by suspending heavy apparatus via wires through the bag and through an orifice at the bottom thereof from which a snorkel tube depends. The purpose of the snorkel tube is to maintain a predetermined pressure head within the bag, with excess gas generated being forced to exit the snorkel tube. In each of two further embodiments the container or canister for the reaction material includes a snap lid which is removed as the activation spring extends. In a first embodiment, the extension of the activation spring peels off the snap lid via a strand running between one edge of the lid and the activation spring. Arming of the sonobuoy can be accomplished with a "Hedloc" type connector to join two portions of the strand. In a second embodiment, a snap ring is fitted around the reaction material canister. The snap ring axially slides down the canister and engages the lip of the lid as the activation spring extends to remove the lid. Thus in both embodiments the reaction material is cast onto the surface of water ingested into the bag when the activation spring is released.

In a still further embodiment the bag, when inflated, is maintained in a generally ellipsoidal cross section by both inflation and the use of a "c"shaped spring which is permitted to expand to a predetermined perimeter with the release of the activation spring. It has been found that for support of apparatus by the top of the bag a float of this ellipsoidal configuration with or without the "c"spring provides sufficient stability and righting, while at the same time providing sufficient support for the floated apparatus.

Snorkel pressurehead maintaining apparatus is described in U.S. Pat. No. 3,226,670 issued to J. D. Richard on Dec. 28, 1965 which describes the use of a flexible snorkel tube. However, this tube is not provided with a flexible pinchoff means at its base. In the subject invention flexible pinchoff means are provided in one embodiment such that when a bag of the above configuration is tilted as by wave action, the orifice through which water is ingested is pinched off thereby sealing the inflated bag against wave motion which would ordinarily compress the bag thereby forcing out a portion of the gas used to inflate the bag. Thus in normal operation, wave action which would ordinarily compress inflatable bags thereby engendering gas loss, serves to cause the intake conduit to be pinched off thereby sealing the bag against the gas loss.

It will be appreciated that while the subject invention is described in connection with sonobuoys the subject reaction material dispensing apparatus and method as well as the bag and apparatus suspension system may be utilized with any type of floated apparatus in which rapid gas evolution is required and in which the particular configuration of the inflated buoy is desired for upright maintenance of the sported apparatus. As such, any apparatus cast into the water, e.g. safety devices including lights, life preservers, and the like, may take advantage of the rapid gas evolution system described. It is further to be understood that the inflated bag system described herein may be utilized to unique advantage in air-dropped apparatus which is to be floated to the sea surface. Because of the high terminal velocities which air-dropped apparatus achieves, descent is rapid and therefore there is a unique need for systems involving rapid gas evolution.

It is therefore an object of this invention to provide a method and apparatus for rapidly evolving gas into expandable bags which are immersed in an aqueous medium.

It is another object of this invention to provide an automatically inflated buoy capable of supporting apparatus at the surface of an aqueous medium.

It is another object of this invention to provide inexpensive sonobuoy support apparatus.

It is a still further object of this invention to provide an improved reaction agent dispensing system which casts the reaction agent upon the surface of water ingested into an expandable container.

It is a still further object of this invention to provide a spring actuated gas evolving inflation system in which gas is rapidly evolved when the apparatus is immersed in water.

It is a yet still further object of this invention to provide an improved inflatable float.

It is a still further object of this invention to provide an improved system for inflating a bag and maintaining the gas pressure in the bag against wave action.

These and other objects of this invention will be better understood in connection with the following description in view of the appended drawings in which.

DETAILED DESCRIPTION

Figures 1A, 1B:
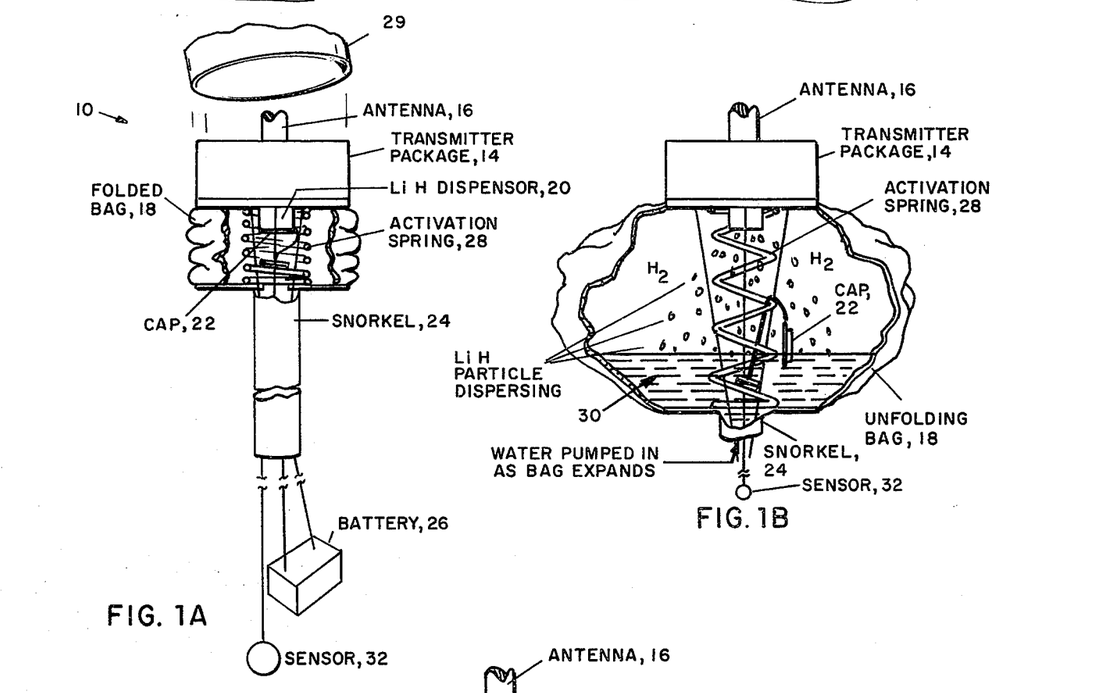
FIGS. 1a through 1c illustrate the inflation sequence for an air-dropped sonobuoy incorporating the subject expandable bag inflation system.
Figure 1C:
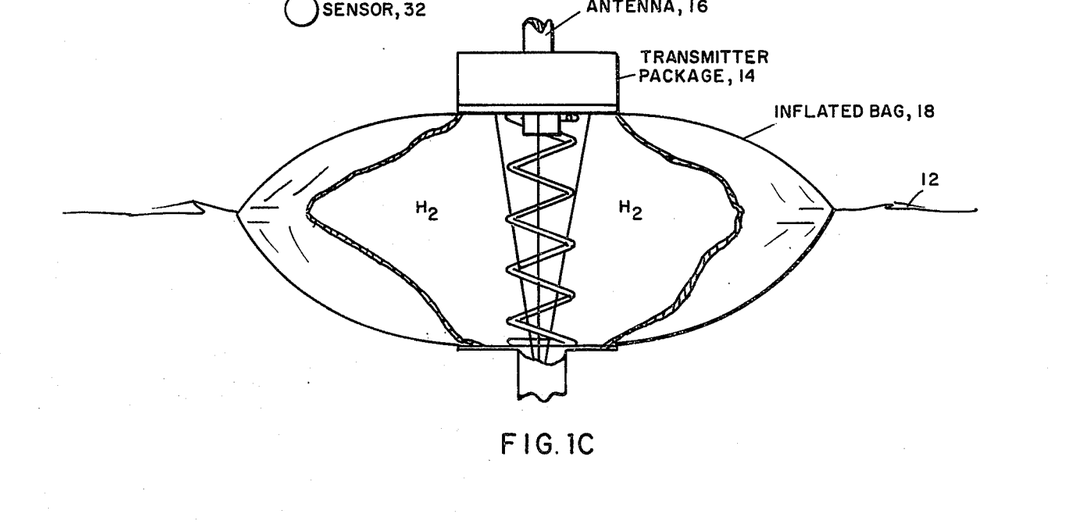

Referring to FIGS. 1a–1c an inflation sequence for an air-dropped sonobuoy adapted to be supported by the subject inflatable bag is described. Referring to FIG. 1a, a sonobuoy float generally designated by the reference character 10 is illustrated as having descended below the sea surface generally indicated by the reference character 12 and before the bag has been expanded. Sonobuoy float 10 includes a transmitter package 14 and an antenna 16 mounted above a folded bag 18 in which a dispenser or canister 20 is mounted. The dispenser carries a finely divided reaction agent such as lithium hydride. Obviously other finely divided materials which react with water to form a gas are within the scope of this invention. Dispenser 20 is sealed by a removeable cap 22 which is situated at the bottom of the dispenser. At the bottom of the bag is located a snorkel 24 which is extended upon immersion into the aqueous medium, the snorkel being in communication with the bottom of the bag. This snorkel may be flexible or rigid and may be made of any suitable material. Connecting wires depend from the transmitter package through the bag and out the end of the snorkel. Attached to these wires may be a battery 26 and signalling apparatus which may include an acoustic sensor, 32. The weight of the battery and the signalling apparatus maintains the sonobuoy float in an upright or vertical orientation during descent. An activation spring 28 is provided inside folded bag 18 which when released forcibly expands the bag to ingest water through the snorkel while at the same time removing the cap from the dispenser to release the activation agent and cast it upon the ingested water. As is usual with air-dropped inflatable sonobuoy packages, the sonobuoy float bag and actuation spring may be contained in a cylindrical tube, normally the skin of the sonobuoy. This tube maintains the spring in its depressed position. Upon hitting the water the entire apparatus is ejected from one end of the tube which releases the activation spring. In this figure an end portion of this tube is illustrated at 29 from which the entire apparatus is ejected downwardly. Alternatively the transmitter package can be ejected upwardly from the upper end of the tube, with the suspended apparatus and tube dropping as wire pays out from the ejected transmitter package.

Referring to FIG. 1b, the situation after the actuation spring 28 extends is illustrated. It will be noted that as the bag expands water generally illustrated at 30 is ingested into the bag through the snorkel. The dispenser cap 22 is shown removed and the reaction agent dispursed or cast onto the surface of the water ingested. In this figure the aforementioned signalling apparatus includes a sensor illustrated at 32. The reaction agent being dispursed over the surface of the water reacts with the water to form hydrogen which fills the bag and causes the entire apparatus to be floated to the sea surface as illustrated in FIG. 1c.

Referring to FIG. 1c, bag 18 is shown inflated with hydrogen. This maintains the transmitter package 14 and antenna 16 in an upright position due primarily to the suspended battery and sensor. The flotation bag can have a generally ellipsoidal cross section as shown or other shapes as desired. From a top view (not shown) the bag may be of circular, square or other form as desired.

Figure 2:
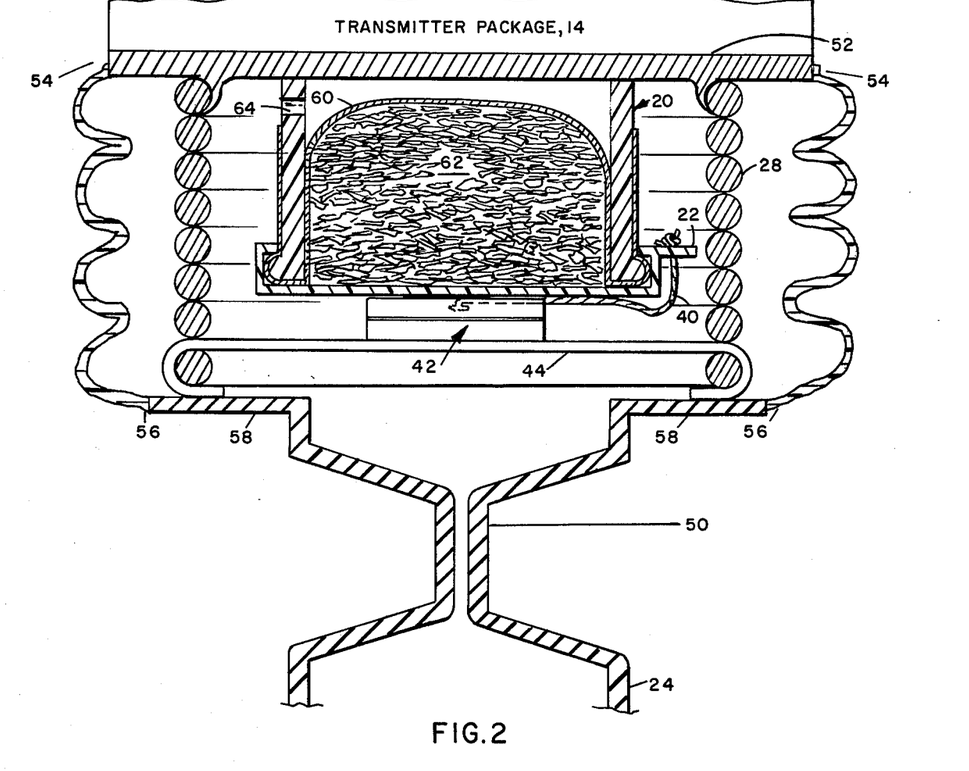
FIG. 2 is a sectional diagram illustrating the bag expansion apparatus in an armed position.

Referring to FIG. 2 a sectional diagram illustrates one embodiment in which cap 22 is removed from dispenser 20 by a strand 40 which is attached to one half of a Hedloc type fastener 42 the bottom half of which is fixedly attached to a cross member 44 which is carried by activation spring 28. In this embodiment, snorkel 24 is provided with pinchoff means 50 as illustrated. As can be seen the body of dispenser 20 may be made integral with the bottom plate 52 of the transmitter package to which is attached a top portion 54 of bag 18. A bottom portion 56 of bag 18 is illustrated as being attached to a flange portion 58 of snorkel 24 which may be integral to the snorkel. Dispenser 20 may be provided with a flexible liner 60 which protects reaction material 62 from humidity during storage and a relief vent 64 which provides pressure compensation to prevent higher external ambient pressure from resisting the release of cap 22. The release of the reaction material is diagramatically illustrated in connection with FIG. 3.

Figure 3:
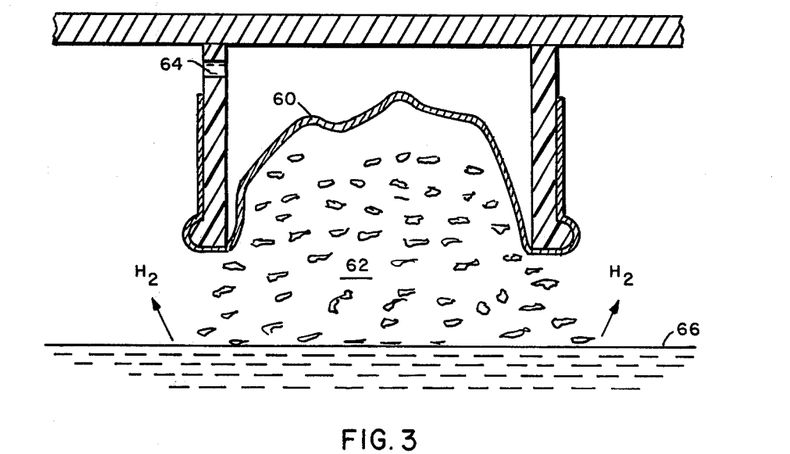
FIG. 3 is a diagramatic representation of the casting of the reaction agent onto the surface of water ingested into the bag of FIG. 2.

Referring to FIG. 3, it can be seen that upon removal of the cap the reaction material 62 is cast upon the surface 66 of the ingested water to cause a rapid reaction from which hydrogen is evolved at a great rate. Because the reaction material is finely divided and is cast freely onto the surface of the water, the reaction takes place rapidly due to the large amount of surface area of the reaction material which is immediately wetted. Thus, gas evolution is rapid and the sonobuoy is prevented from descending to depths at which the pressure would be too great for bag expansion.

Figure 4A:
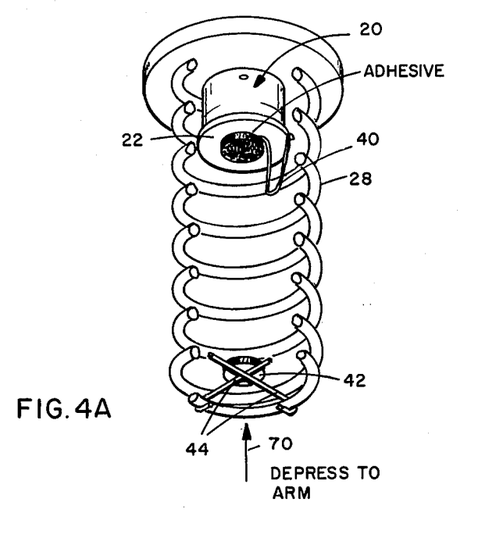
FIGS. 4a through 4d indicate an arming and release sequence for one embodiment of the reaction agent dispenser in which a snap lid is peeled off of the container housing the reaction agent.
Figure 4B:
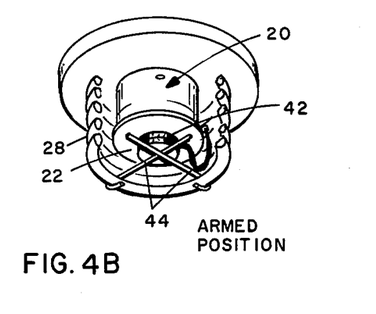
Figure 5:
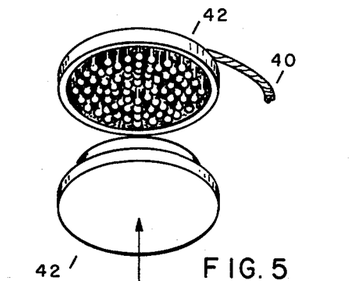
FIG. 5 is an exploded view of the Hedloc fastener of FIGS. 4a through 4d.

Referring to FIGS. 4a through 4d, in which elements of the preceding figures are described with like reference characters, and more particularly with respect to FIG. 4a a typical arming process is described. In this process one half of the Hedloc type fastener 42 is mounted on supports 44 with the other half lightly fastened to cap 22 as illustrated. When the lower half of the Hedloc fastener is moved in the direction of arrow 70 during arming the two halves of the Hedloc fastener mate so that later release of the activation spring 28 will result in the pulling of the top half of the Hedloc fastener away from lid 22. As illustrated in FIG. 4b the arming position results when the activation spring 28 is fully compressed and the two halves of the Hedloc fastener come into engagement as normally occurs when the float assembly is packaged within the sonobuoy skin. It will be appreciated that strand 40 is fixedly attached to the top portion of the Hedloc fastener as illustrated in connection with FIG. 5 so that there is a mechanical connection between the activation spring and cap 22.

Figure 4C:
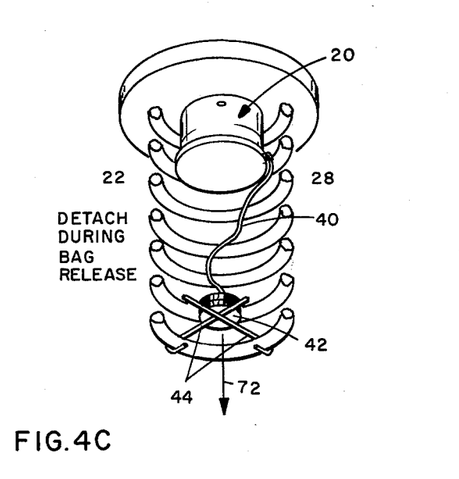

Referring now to FIG. 4c, when the activation spring 28 is released the Hedloc fastener 42 is detached from lid 22 and is carried downwardly as illustrated by arrow 72.

Figure 4D:
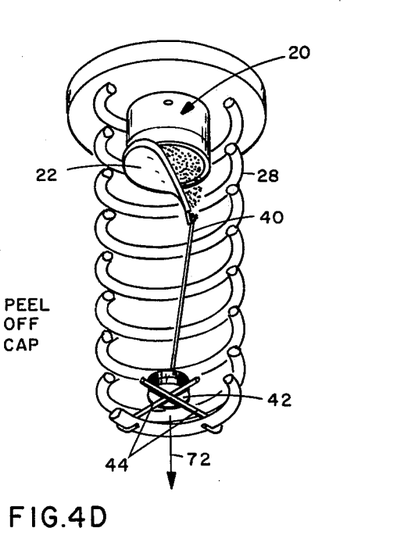

As the activation spring extends as illustrated in FIG. 4d, strand 40 becomes taut thereby peeling off cap 22 to permit release of the reaction agent contained in dispenser 20.

Figure 6:
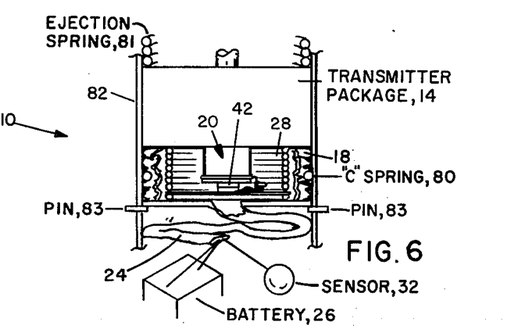
FIG. 6 illustrates a configuration in which a "c" shaped spring is utilized to maintain a bag in its expanded shape, with the apparatus being in its armed position within the sonobuoy housing.
Figure 7:
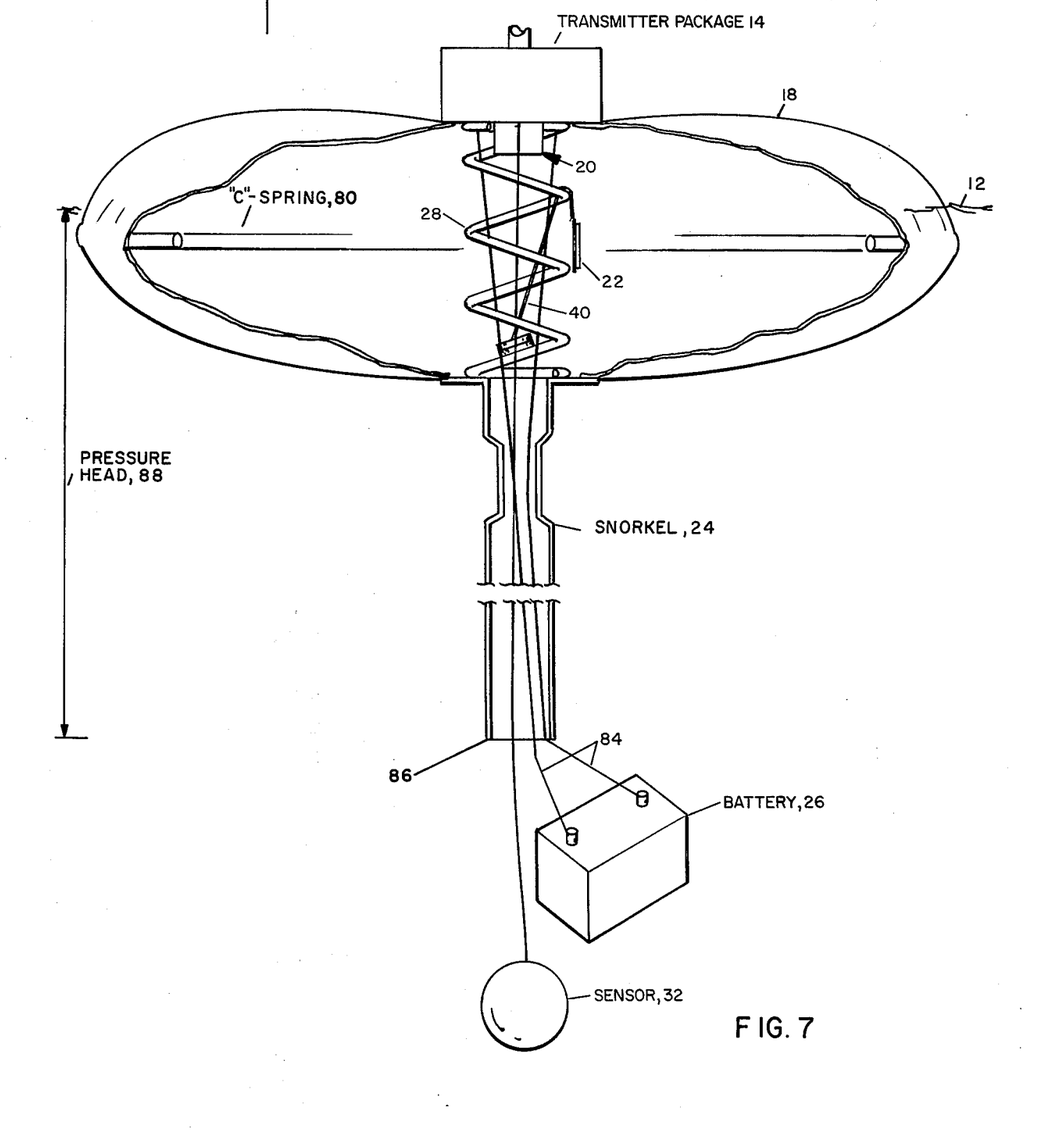
FIG. 7 is a diagramatic representation of the "c" spring configuration in which the "c" spring has expanded with the expansion of the bag.

In order to aid in the maintenance of the inflated bag in a generally ellipsoidal configuration and to aid the activation spring in the ingestion of water a "c" spring initially collapsed in the housing or sonobuoy skin carrying the collapsed bag, may be used. This is illustrated in FIG. 6, where a "c" spring 80 is in its collapsed position within bag 18 and is oriented co-axial to activation spring 28. Housing 82 maintains the "c" spring in its collapsed condition. Reference characters in this figure are the same as those in the preceding figures for the same elements. When the sonobuoy apparatus generally indicated by reference character 10 is ejected by ejection spring 81 from housing 82 into the water after extraction of pins 83, the "c" spring expands as illustrated in FIG. 7 to aid in maintaining the generally ellipsoidal shape of bag 18 and to aid the activation spring to induct water. The suspension of battery 26 via wires 84 through snorkel 24 is illustrated in this figure. It will be noted that the pressure head of the gas inside bag 18 is defined by the pressure differential between the end 86 of snorkel 24 and the sea surface 12 as indicated by arrow 88. It will therefore be appreciated that the length of the snorkel determines the pressure of the gas in the bag.

Figure 8:
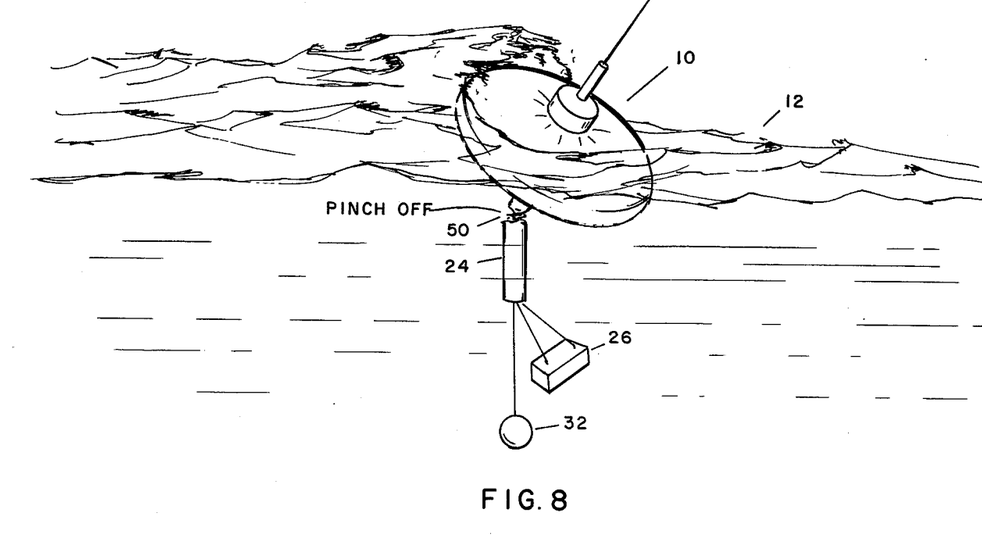
FIG. 8 is a diagramatic illustration of the pinchoff at the snorkel tube when the inflated bag and supported apparatus are knocked off a vertical orientation by wave action.

Referring now to FIG. 8 the aforementioned pinchoff of the snorkel is illustrated for the situation in which the sonobuoy is knocked off its vertical position by wave action. As can be seen, due to the weight of battery 26, and sensor 32, snorkel 24 is maintained in a vertical position whereas the bag is tilted with respect to the horizontal by a wave. This causes the pinchoff to occur at the aforementioned flexible pinchoff means 50. The pinchoff means in one embodiment is a constricted section in the upper end of the snorkel which permits bending, causing this section of the snorkel to collapse on itself to restrict the orifice at the base of the bag. Thus the bag remains inflated even when buffeted in relatively high sea states.

Figure 9:
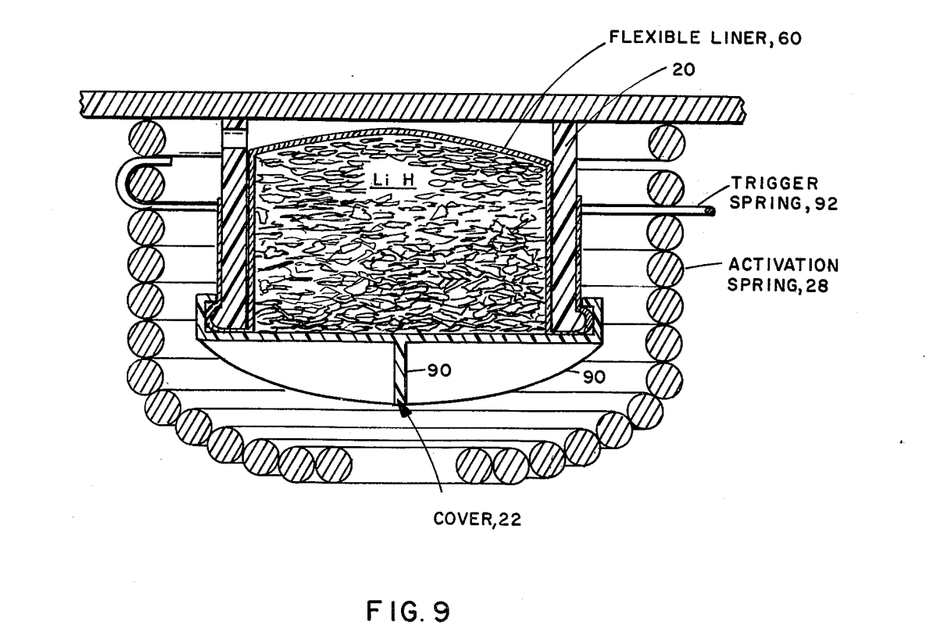
FIG. 9 is a sectional view of a second snap lid removal system utilizing a trigger snap ring which moves vertically into engagement with the snap lid upon release of the activation spring to remove the lid.

Referring to FIG. 9 an alternative method for removing the cap from dispenser 20 is illustrated. In this configuration snap lid cover 22 is provided with orthogonal camming surfaces or ridges 90 over which a trigger spring 92 is slipped when the activation spring 28 is fully compressed. Here again, like reference characters refer to like elements illustrated in the preceding figures. This method of cap removal is more fully described in connection with FIGS. 10a through 10c.

Figure 10A:
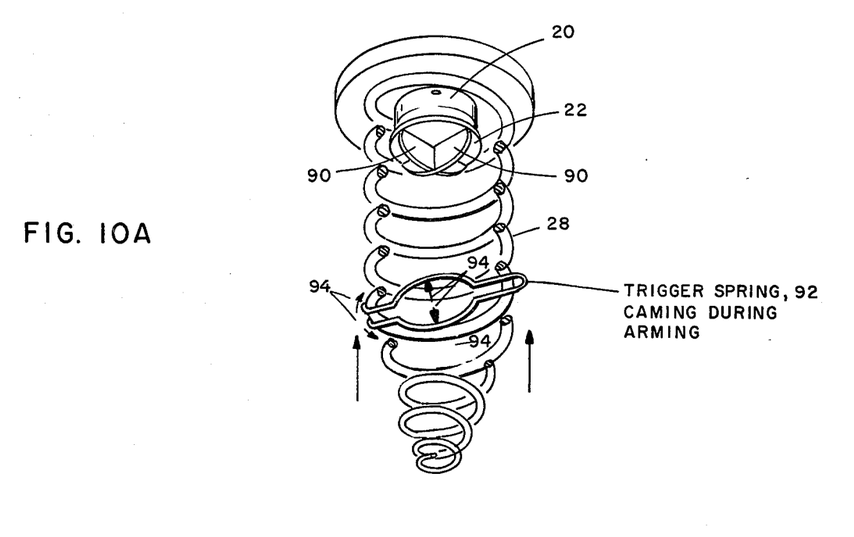
FIGS. 10a through 10c indicate an arming and cap removal sequence for the FIG. 9 configuration.

Referring now to FIG. 10a, trigger spring 92 is shown as a generally U-shaped spring which is carried by activation spring 28 such that when activation spring 28 is compressed, the trigger spring is cammed outwardly as shown by arrows 94 as the trigger spring is drawn onto and over lid 22.

Figure 10B:
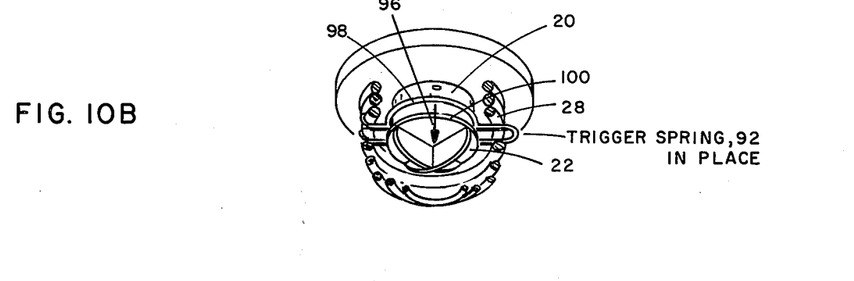
Figure 10C:
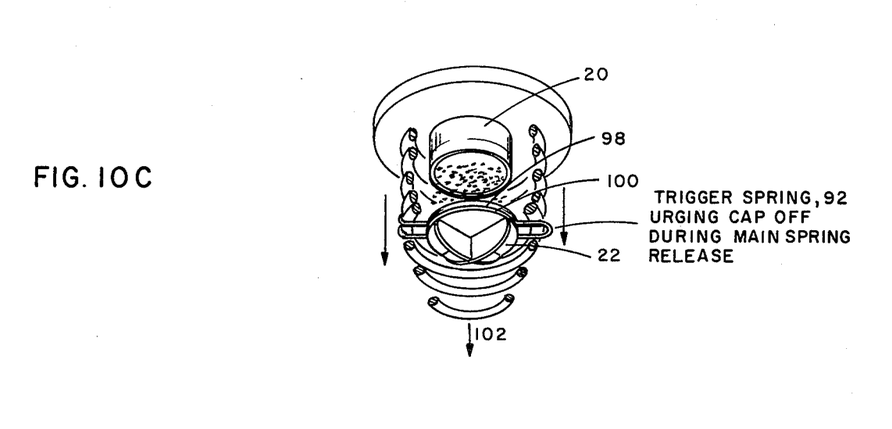

Referring to FIG. 10b, trigger spring 92 is illustrated as being in place and lying co-axially of the dispenser housing 20 when the activation spring 28 is fully compressed. When the activation spring is released, trigger spring 92 moves in the direction illustrated by arrow 96 such that portions 98 of the spring press against the bottom flange 100 of the lid to remove lid 22. The removal of the lid is illustrated in FIG. 10c. It will be appreciated that the cooperation of the trigger spring with the edge of the lid moves the lid away from the dispenser as illustrated by arrow 102.

What has therefore been provided is a method for inflating an expandable bag quickly enough to prevent a sonobuoy from descending to ocean depths which would preclude bag inflation sufficient to raise the buoy to the surface again. This is accomplished by the rapid evoluation of gas caused by the casting of the finely divided reaction material on the surface of the ingested water. The dispensing of the reaction material in this manner is provided by the removal of a container lid with the extension of the spring utilized in the ingestion of the water. Thus the spring serves two purposes, one of providing the motive force for the pumping action which ingests the water, and secondly for providing for the removal of the lid. Another important feature is the pinch-off snorkel design which prevents deflation of the bag under high sea state condition.

Although a specific embodiment to the invention has been described in considerable detail for illustrative purposes, many modifications will occur to those skilled in the art. It is therefore desired that the protection afforded by Letters Patent be limited only by the true scope of the appended claims.

I claim:
1. An inflation system for waterborne apparatus comprising:
    an expandable container for supporting said apparatus, said container having an orifice,
    means for orienting said waterborne apparatus to an upright position in the water,
    spring biased means for expanding said container when said container is immersed in water thereby to ingest water into said container through said orifice to produce a body of water within the container having a top surface, a supply of material located above said body of water which reacts with water to form a gas, said material being in finely divided form, and means coacting with said spring biased means for dispensing said finely divided material from said location above said body of water to said top surface of the ingested water, thereby to cause rapid inflation of said container.

2. The inflation system of claim 1 and further including means connected between said spring biased means and said dispensing means for actuating said dispensing means upon extension of said spring biasing means.

3. The inflation system of claim 2 wherein said spring biased means lies solely within said container.

4. The inflation system of claim 1 wherein said apparatus orienting means includes a tube communicating with and extending outwardly from said orifice, and means for occluding a portion of said tube responsive to tilting of said container after said container is inflated.

5. The inflation system of claim 4 wherein said orienting means includes means for maintaining a substantial portion of said tube in a vertical orientation.

6. The inflation system of claim 5 wherein said orienting means includes a heavy body and means for suspending said heavy body through said tube.

7. The inflation system of claim 1 wherein said dispensing means includes a reaction material container with an exit port and means covering said port, said reaction material container being mounted within said container such that said port faces the orifice of said container, and further including means cooperating with said spring biasing means to effect removal of said covering means with the extension of said spring biased means, thereby to effect dispensing of said material and ingestion of water into the container at the same time.

8. The inflation system of claim 7 wherein said covering means includes a snap lid and wherein said means for effecting removal of said covering means includes a two part fastener, one part carried by said spring biased means and a strand connected between one part of said snap lid and the other part of said two part fastener, extension of said spring biasing means causing said strand to peel off said snap lid.

9. The inflation system of claim 8 wherein said other part of said two part fastener is releasably mounted on said snap lid and wherein the parts of said two part fastener mate when said spring biased means is depressed.

10. The inflation system of claim 7 wherein said covering means includes a snap lid having camming means on the exterior surface thereof and wherein said means for effecting removal of said covering means includes a spring carried by said spring biasing means, a portion of said spring adapted to be cammed outwardly by said camming means to slip over said snap lid and onto said reaction material container when said spring biasing means is depressed and to coact with said snap lid to move said snap lid away from the exit port of said reaction material container when said spring biasing means extends.

11. The inflation system of claim 1 wherein said spring biased means includes a helical spring and a "c" shaped spring.

12. The inflation system of claim 1 wherein said container is so configured that it assumes the cross sectional shape of an ellipse when inflated.

13. Air-dropped sonobuoy support apparatus comprising:

an expandable bag having an orifice, a transmitter package mounted on top of said bag, spring biased means for expanding said bag when said bag is immersed in water thereby to ingest water into said bag through said orifice to produce a body of water having a top surface, a tube communicating with and extending from said orifice, electronic apparatus suspended beneath said tube by means passing through said tube connected to said transmitter package to maintain said air-dropped apparatus upright when immersed in water, a supply of material located above said ingested body of water within said bag which reacts with water to form a gas, said material being in finely divided form, and means for dispensing said finely divided material from said location above said body of water onto said top surface of the ingested water thereby to cause rapid inflation of said bag prior to descent of said sonobuoy support apparatus to a depth which would preclude raising of said sonobuoy apparatus to the surface of the water.

14. The apparatus of claim 13 wherein said tube includes means for restricting said tube when said bag is tilted off a vertical axis.

15. An inflatable system for supporting apparatus which is ejected into water comprising:

an expandable container having a water inlet orifice, means for mounting said apparatus on said container, means for orienting said apparatus to an upright position when said apparatus is immersed in water, means for ingesting water through said orifice into said container when said system is in the water to produce a body of water within said container, said body of water having a top surface, a supply of material located above said body of water which reacts with water to form a gas, said material being in finely divided form, and means located above said body of water for dispensing said finely divided material over said top surface of the water ingested into said container to cause rapid gas evolution and consequent rapid container inflation.

16. A system for rapid evolution of gas in a water activated inflation system in which an expandable container is to be filled with gas comprising:

means for maintaining said expandable container upright when it is immersed in water, means for ingesting water into said container to produce a body of water within said container, said body of water having a top surface, a supply of material located above said body of water which reacts with water to form a gas, said material being in finely divided form, and means above said body of water for rapidly depositing said material on said top surface of the water ingested into said container whereby the resulting rapidly evolving gas quickly inflates said container.

17. An inflation system for waterborne apparatus comprising:

an expandable container for supporting said apparatus, said container having an orifice, spring biased means for expanding said container when said container is immersed in water thereby to ingest water into said container through said orifice, a supply of material which reacts with water to form a gas, said material being in finely divided form, and means for dispensing said finely divided material on the surface of ingested water, thereby to cause rapid inflation of said container, said dispensing means including a reaction material container with an exit port and means covering said port, said reaction material container being mounted within said bag such that said port faces the orifice of said container, and means cooperating with said spring biasing means to effect removal of said covering means with the extension of said spring biased means, thereby to effect dispensing of said material and ingestion of water into the container at the same time.

18. The inflation system of claim 17 wherein said covering means includes a snap lid and wherein said means for effecting removal of said covering means includes a two part fastener, one part carried by said spring biased means and a strand connected between one part of said snap lid and the other part of said two part fastener, extension of said spring biasing means causing said strand to peel off said snap lid.

19. The inflation system of claim 18 wherein said other part of said two part fastener is releasably mounted on said snap lid and wherein the parts of said two part fastener mate when said spring biased means is depressed.

20. The inflation system of claim 17 wherein said covering means includes a snap lid having camming means on the exterior surface thereof and wherein said means for effecting removal of said covering means includes a spring carried by said spring biasing means, a portion of said spring adapted to be cammed outwardly by said camming means to slip over said snap lid and onto said reaction material container when said spring biasing means is depressed and to coact with said snap lid to move said snap lid away from the exit port of said reaction material container when said spring biasing means extends.

* * * * *

UNITED STATES PATENT OFFICE
CERTIFICATE OF CORRECTION

PATENT NO. : 3,977,031
DATED : August 31, 1976
INVENTOR(S) : Roger I. Saunders

It is certified that error appears in the above-identified patent and that said Letters Patent are hereby corrected as shown below:

Column 2, line 49, change "sported" to --supported--.

Column 9, line 12, cancel "bag" and substitute --container--.

Signed and Sealed this

Twenty-second Day of February 1977

[SEAL]

Attest:

RUTH C. MASON
*Attesting Officer*

C. MARSHALL DANN
*Commissioner of Patents and Trademarks*